United States Patent Office 3,506,686
Patented Apr. 14, 1970

3,506,686
PROCESS FOR THE PRODUCTION OF A 5-CARBOXY-1,3-DIOXANE COMPOUND, AND THE RESULTING COMPOUNDS
Lars-Olof Ryrfors, Perstorp, Sweden, assignor to Perstorp AB, Perstorp, Sweden
No Drawing. Filed Dec. 27, 1967, Ser. No. 639,702
Claims priority, application Sweden, Jan. 25, 1967,
1,065/67
Int. Cl. C07d *15/04*
U.S. Cl. 260—340.7   6 Claims

ABSTRACT OF THE DISCLOSURE 5-acetyl-1,3-dioxanes, which may or may not be additionally substituted in the 5-position by —$CH_2OH$, —$CH_3$, —$C_2H_5$, or in general $C_nH_{2n+1}$, are oxidized to the corresponding novel 5-carboxy-1,3-dioxanes. The latter are useful intermediates for the preparation by hydrolysis of methylolalkanoic acids, which in turn are useful (as disclosed in the prior French Patent No. 1,418,073) for making alkyd resins.

---

The present invention relates to a process for the production of a 5 - carboxy-1,3-dioxane compound and it is characterized in that a compound having the formula

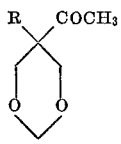

where
R=H, $CH_2OH$, $CH_3$, $C_2H_5$, $C_nH_{2n+1}$ is oxidized to the corresponding carboxy compound having the formula

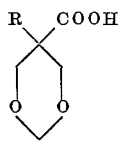

where R has the same meaning as above.

According to French Patent No. 1,418,073, it is already known to produce, for example, dimethylolpropionic acid. Formaldehyde is reacted with propionaldehyde to form dimethylolpropionaldehyde, which is thereafter oxidized with peroxide to dimethylolpropionic acid.

For the production of the same acid according to the present invention, the starting material is 5-acetyl-5-methyl-1, 3-dioxane (R=$CH_3$ in the formula shown above) which is then oxidized to 5-carboxy-5-methyl-1,3-dioxane, which in turn is hydrolized to dimethylolpropionic acid.

By changing R in the starting compound, different 5-carboxy-1,3-dioxanes can be obtained by the oxidation, which then give different methylolalkanoic acids by hydrolysis. If R=$C_2H_5$ for example, 5-carboxy-5-ethyl-1,3-dioxane is obtained, and thereafter dimethylolbutyric acid. When R=H, 5-carboxy-1,3-dioxane is obtained, which can be hydrolyzed to dimethylolacetic acid. When R=$CH_2OH$, 5-carboxy-5-methylol-1,3-dioxane is obtained, which gives trimethylolacetic acid.

Suitable oxidizing agents according to the present invention are sodium hypochlorite which should be employed in excess or potassium permanganate, but also other oxidizing agents for example hydrogen peroxide can be used.

The oxidation is somewhat affected by pH-variations. To obtain a good yield the sodium hypochlorite should be alkaline. A suitable pH is about 12.

The temperature of the reaction mixture during the oxidation should preferably be less than +15° C. However, higher temperatures can be used.

Before the oxidation to a 5-carboxy-1,3-dioxane compound the compound having the formula

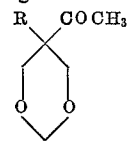

is suitably dissolved in water or a solvent which itself is soluble in water. Such solvents are for example alcohols such as ethanol and methanol or ethanol-water, methanol-water or only water.

Before the thus produced cyclic carboxylic acid is hydrolyzed, it is dissolved in a suitable solvent such as methanol. Upon hydrolysis the methanol absorbs the formaldehyde produced during the reaction, forming methylal which can be distilled off at a relatively low temperature. Other solvents can be used if they can absorb the produced formaldehyde and with it give a compound which can be distilled off at a low temperature.

The following working examples fall into two categories because of the fact that the process according to the present invention includes first the production of the aforesaid cyclic carboxylic acids which can then be hydrolyzed to methylolalkanoic acids. Consequently Examples 1–9 illustrate the production of the aforesaid cyclic carboxylic acids, while Examples 10 and 11 illustrate the hydrolysis of such acids to methylolalkanoic acids.

EXAMPLE 1

5-acetyl-5-methyl-1,3-dioxane (21.6 g.=0.15 mole) dissolved in 50 ml. ethanol was added dropwise during 30 minutes and at a temperature of less than +15° C. to a NaOCl-solution (400 ml.=0.45 mole NaOCl) having a pH of 12.5. Then the solution was stirred for another 30 minutes, acidified to a pH of 2.5 and shaken with 3×50 ml. ethyl acetate. The ethyl acetate phases were joined and evaporated to dryness. 17 g. colourless crystals having a fusing point of 70–75° C. were obtained. A recrystallization from ethyl acetate and hexane increased the fusing point to 81–83° C. The yield was 16 g. 5-carboxy-5-methyl-1,3-dioxane or 75% of the theoretical one.

EXAMPLE 2

The process according to Example 1 was repeated with the difference that the temperature was allowed to increase to about 40–50° C. The yield was 16 g. 5-carboxy-5-methyl-1,3-dioxane or 75% of the theoretical one. The fusing point was 80–83° C.

EXAMPLE 3

The process according to Example 1 was repeated with the modification that a surplus of NaOCl was used. Now 0.55 mole NaOCl was added. The yield was 20 g. 5-carboxy-5-methyl-1,3-dioxane or 90% of the theoretical one. The fusing point was 80–83° C.

EXAMPLE 4

The process according to Example 3 was repeated with the exception that the 5-acetyl-5-methy-1,3-dioxane was not dissolved in ethanol but was dropped directly into the NaOCl-solution. The yield was 18 g. 5-carboxy-5-methyl-1,3-dioxane or 80% of the theoretical one. The fusing point was 80–83° C.

EXAMPLE 5

5-acetyl-5-methyl-1,3-dioxane (21.6 g.=0.15 mole) was dissolved in 100 ml. $H_2O$ containing 3 g. NaOH, whereupon $KMnO_4$ (23.6 g.=0.15 mole) dissolved in 200 ml. $H_2O$ was added dropwise under stirring. The temperature was allowed to increase to about 50° C. When all of the KMnO₄ had been added, the solution was filtered. The filtrate was acidified with HCl to a pH of 2.5. Then it was extracted with ethyl acetate. The evaporation of the ethyl acetate phase gave a yellow oil, which partly crystallized and gave 3 g. colourless crystals of 5-carboxy-5-methyl-1,3-dioxane having a fusing point of 81–83° C. The remaining oil was distilled and gave 8 g. starting compound 5-acetyl-5-methyl-1,3-dioxane.

EXAMPLE 6

5-acetyl-5-ethyl-1,3-dioxane (15.8 g.=0.1 mole) dissolved in 50 ml. ethanol was dropped during 30 minutes at a temperature less than 15° C. into a NaOCl-solution (200 ml.=0.4 mole NaOCl) having a pH of 12. The solution was stirred for another 30 minutes and treated according to Example 1. The yield was 11.5 g. colourless crystals of 5-carboxy-5-ethyl-1,3-dioxane having a fusing point of 76–78° C. The theoretical yield is 75%.

EXAMPLE 7

5-acetyl-5-ethyl-1,3-dioxane (23.8 g.=0.15 mole) dissolved in 50 ml. ethanol was dropped during 30 minutes at a temperature of lower than +10° C. into 400 ml. NaOCl-solution (0.55 mole NaOCl). Then the solution was stirred for another 30 minutes, acidified with HCl to a pH of 2.5 and shaken with ethyl acetate 3×50 ml. The ethyl acetate phases were joined and evaporated to dryness. Then 18 g. colourless crystals of 5-carboxy-5-ethyl-1,3-dioxane having a fusing point of 74–77° C. were obtained. A recrystallization from ethyl acetate and hexane increased the fusing point to 76–78° C. The yield was 17.5 g. or 73% of the theoretical one.

EXAMPLE 8

The process according to Example 7 was repeated with the difference that the temperature was allowed to rise to about 40–50° C. The yield was 17 g. 5-carboxy-5-ethyl-1,3-dioxane or 70% of the theoretical one. The fusing point was 76–78° C.

EXAMPLE 9

The process according to Example 7 was repeated with the difference that the 5-acetyl-5-ethyl-1,3-dioxane was not dissolved in ethanol but was dropped directly into the NaOCl-solution. The yield was 17 g. 5-carboxy-5-ethyl-1,3-dioxane or 70% of the theoretical one. The fusing point was 76–78° C.

The 5-carboxy-1,3-dioxane compounds of the present invention may be readily converted by hydrolysis to methylolalkanoic acids. This is illustrated by the following detailed working examples:

EXAMPLE 10

5-carboxy-5-methyl-1,3-dioxane (11 g.=0.075 mole) was dissolved in methanol (9 g.=0.3 mole), whereupon H₂SO₄ (0.25 g.=2.5 mmol) dissolved in 5 g. H₂O was added and the solution was heated to boiling. Then the produced methylal was distilled off. After 24 hours, when no more methylal escaped, the temperature of the column was increased and the methanol was distilled off. Then the solution was cooled and 30 ml. H₂O and 30 ml. ethyl acetate were added. The H₂O-phase was separated off, neutralized and evaporated. The yield was 2 g. or 23% dimethylolpropionic acid having a fusing point of 180–183° C.

EXAMPLE 11

5-carboxy-5-ethyl-1,3-dioxane (32 g.=0.2 mole) was dissolved in methanol (20 g.=0.6 mole) whereupon H₂SO₄ (0.5 g.=5 mmol) dissolved in 20 g. H₂O was added and the solution was reflux boiled while methylal was distilled off. After 24 hours the temperature of the column was increased and the remaining methanol was distilled off. The pH of the solution was adjusted to 2.5 and the solution was shaken with benzene. The benzene phase was evaporated and 14 g. starting product was recovered. The water phase was shaken with ethyl acetate and from that, 10 g. dimethylolbutyric acid having a fusing point of 107–110° C. was obtained. The theoretical yield is ≈34%.

As is well known in the prior art (e.g., see French Patent No. 1,418,073) the methylolalkanoic acids are useful in the preparation of alkyd resins.

What is claimed is:

1. A process for the production of a 5-carboxy-1,3-dioxane compound wherein a compound having the formula

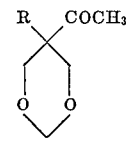

is oxidized to the corresponding carboxy compound having the formula

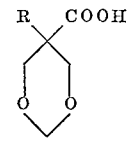

where R=H, CH₂OH, CH₃ or C₂H₅.

2. A process according to claim 1, wherein the oxidizing agent is sodium hypochlorite.

3. A process according to claim 1, wherein the oxidizing agent is potassium permanganate.

4. A 5-carboxy-1,3-dioxane compound having the formula

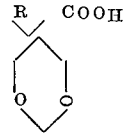

where R=H, CH₂OH, CH₃ or C₂H₅.

5. 5-carboxy-5-methyl-1,3-dioxane.

6. 5-carboxy-5-ethyl-1,3-dioxane.

References Cited

UNITED STATES PATENTS

| | | | |
|---|---|---|---|
| 3,015,665 | 1/1962 | Wöllner | 260—340.7 |
| 3,024,249 | 3/1962 | Wöllner | 260—340.7 |

ALEX MAZEL, Primary Examiner

J. H. TURNIPSEED, Assistant Examiner

U.S. Cl. X.R.

260—22, 535

CERTIFICATE OF CORRECTION

Patent No. 3,506,686     Dated April 14, 1970

Inventor(s)  LARS-OLOF RYRFORS

It is certified that error appears in the above-identified patent and that said Letters Patent are hereby corrected as shown below:

In the Heading, for "Ser. No. 639,702" read -- "Ser. No. 693,702" --.

(SEAL)
Attest:

Edward M. Fletcher, Jr.
Attesting Officer

WILLIAM E. SCHUYLER, JR.
Commissioner of Patents